Sept. 27, 1966   M. M. MOULDER   3,275,194
DISPENSER OF TREATMENT MATERIALS INTERPOSABLE
BETWEEN TWO GARDEN HOSE PORTIONS
Filed Sept. 17, 1964   2 Sheets-Sheet 2
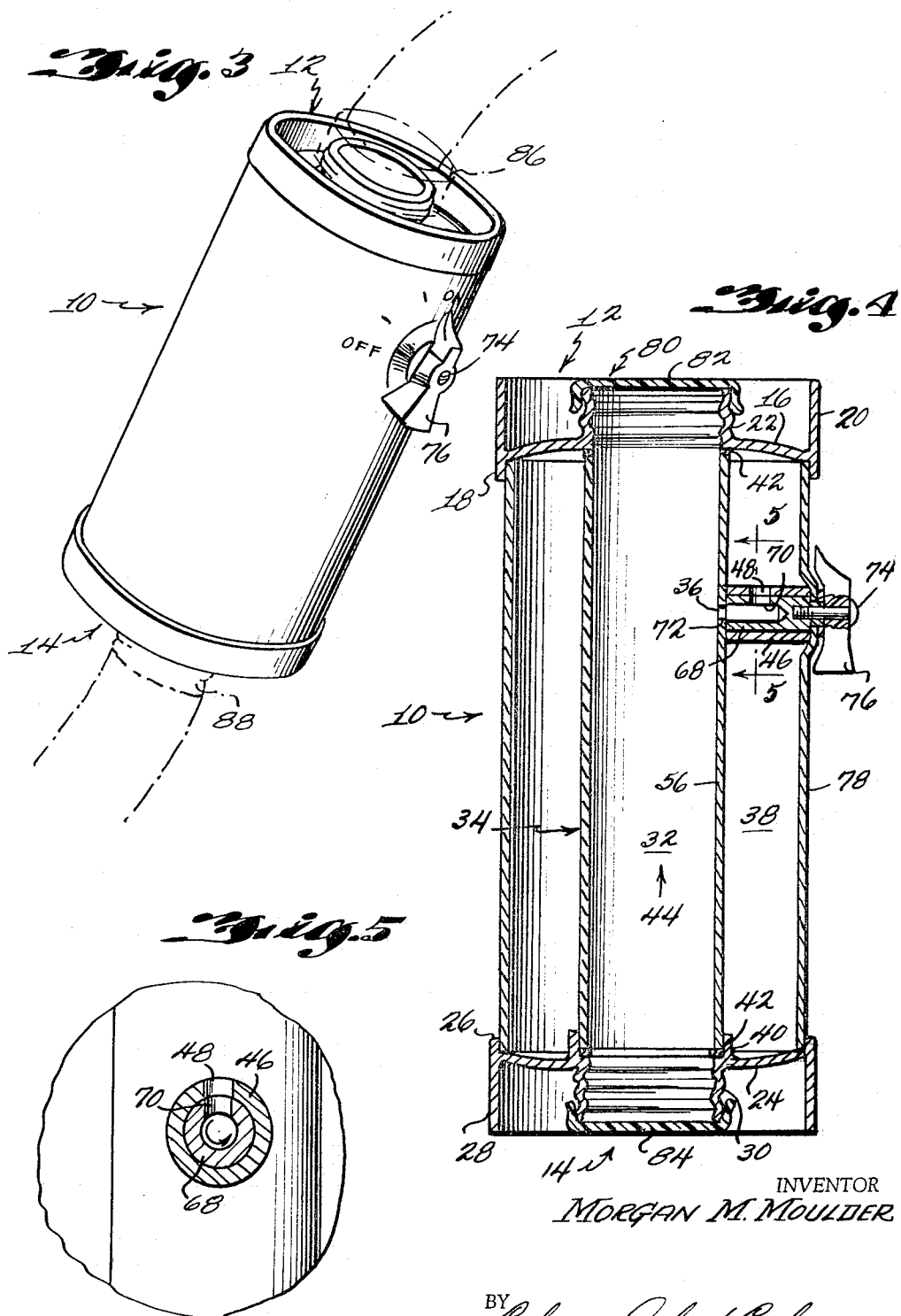
INVENTOR
MORGAN M. MOULDER
BY Cushman, Darby & Cushman
ATTORNEYS 3,275,194
DISPENSER OF TREATMENT MATERIALS INTERPOSABLE BETWEEN TWO GARDEN HOSE PORTIONS
Morgan M. Moulder, Camdenton, Mo.
Filed Sept. 17, 1964, Ser. No. 397,087
3 Claims. (Cl. 222—48)

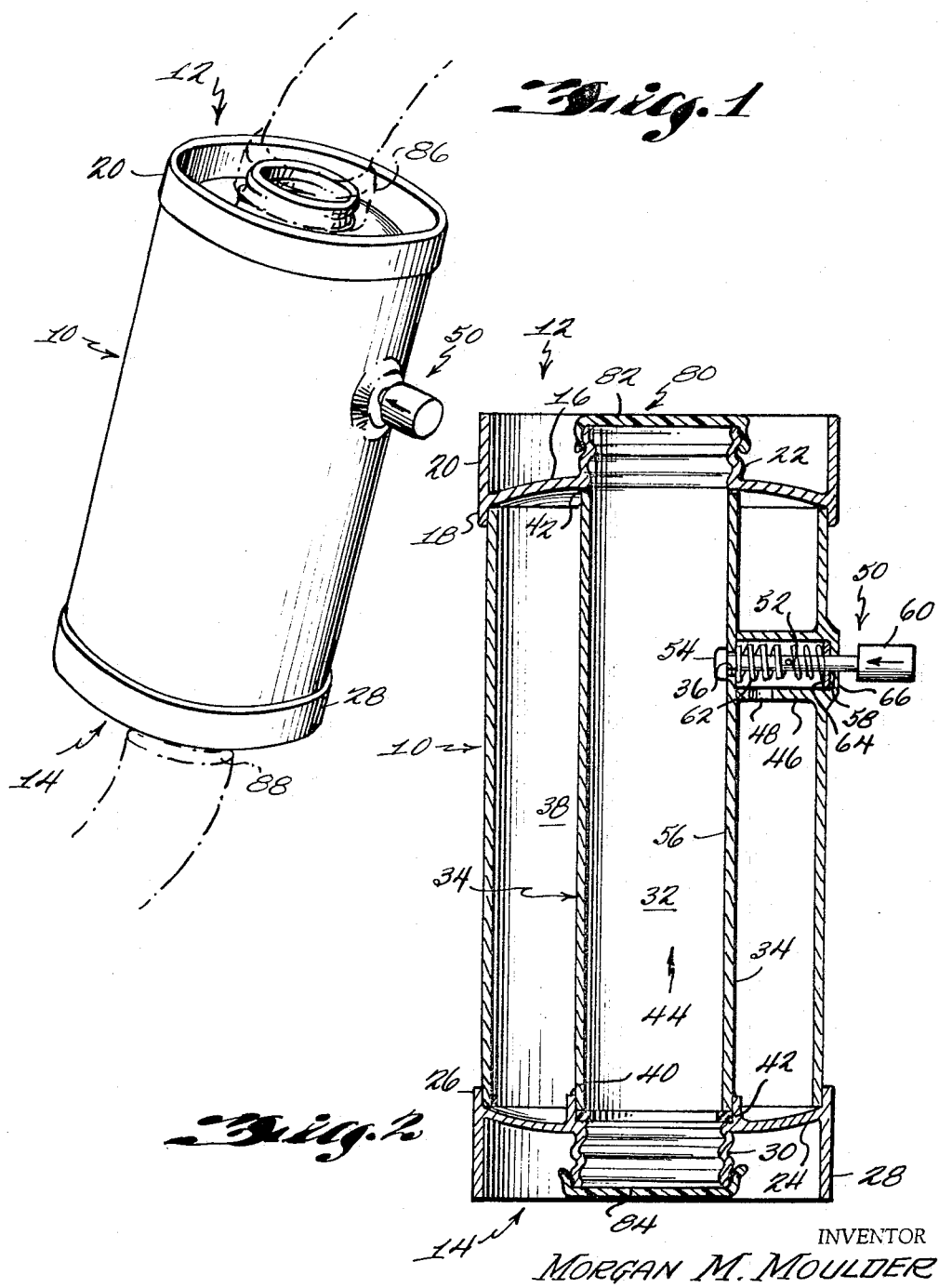

This invention relates to a container adapted for connection with an ordinary garden hose. More particularly, the invention relates to a container provided with liquid vegetation treating agents such as liquid fertilizers, disinfectants, insecticides, weed and crabgrass killers, or with liquid fire extinguisher compositions such as zinc chloride or magnesium chloride solutions, sodium silicate and potassium bicarbonate solutions or any other conventional and suitable composition under pressure. When the container of this invention is supplied with a liquid vegetation treating agent, the contents of said container are effectively applied on lawns and gardens when the container is interposed between the hose and the nozzle of a garden hose. When the contents of said container comprise a liquid fire extinguisher composition, the contents can be readily used to advantage to extinguish fires or to prevent fires by acting as a coolant for parts or areas likely to be contacted by flammable material. Passage of water through the container and manual release of the liquid contained in the container causes admixture of the liquid material with the water and spraying of the resulting aqueous solution onto the surface or area to be treated.

Spray devices for applying a treating agent to a lawn vegetation or for discharging a fire extinguishing composition have been known but the present invention embodies certain novel concepts which are advantageous and which provide a container commercially more attractive. The container according to the instant invention can be made inexpensively for single use with the water soluble or dispersible treating agent preinstalled under pressure in it. Further, the instant invention because of its novel construction provides a container which can more easily be shipped, stored and displayed than other devices generally used for dispensing a treating agent to a lawn or vegetation or for discharging a fire extinguishing composition, thus effecting substantial savings in the cost thereof to the ultimate consumer.

It is therefore an object of the present invention to provide a container which is easily transportable and storable.

Another object of the instant invention is to provide a disposable cylindrical container containing an apertured tube axially disposed within the container which provides an annular chamber to hold liquid water-soluble or dispersible agent under pressure.

A further object of this invention is to provide a container that comprises a cylindrical body member provided with a concentric axially disposed apertured tube in alignment and in communication with an inlet and outlet means, the body member with the tube providing an annular chamber to retain liquid water-soluble or dispersible material under pressure, the body member being provided with a forward and rearward member fixedly attached thereto, as well as being provided adjacent the forward member thereof with means to releasably disperse said treatment material under pressure from said annular chamber through said axially aligned tube out said forward member.

Still further objects, advantages and novel features of this invention will become apparent in the following description and claims, taken with the accompanying drawings wherein:

FIGURE 1 is a perspective view of one embodiment of the instant invention;
FIGURE 2 is a cross-sectional view of the container taken on line 2—2 of FIGURE 1;
FIGURE 3 is a perspective view of another embodiment of the invention;
FIGURE 4 is a cross-sectional view of the container taken along the line 4—4 of FIGURE 3; and
FIGURE 5 is a cross-sectional view taken along the line 5—5 of FIGURE 4.

As illustrated in these figures, the reference numeral 10 designates the body member of the container which, as shown, can have any desired shape in cross-section, for instance, circular or rectangular. The body member 10, generally, is provided with a forward portion 12 and a rearward portion 14. The forward portion 12 comprises a convex plate 16 substantially transverse to the longitudinal axis of the body member 10 and provided with a radially inwardly extending flange or body engaging means 18, a radially outer outwardly extending circumferential flange 20 and a radially inner outwardly extending inlet 22 concentric with the body member 10, said inlet providing coupling means for the device with a hose. The rearward portion 14 comprises a concave plate 24 disposed substantially transverse to the longitudinal axis of the body member 10 and provided with a radially inwardly extending flange or body engaging member 26, a radially outer outwardly extending circumferential flange 28 and a radially inner outwardly extending outlet means 30 concentric with said body member 10, said outlet also providing coupling means with a hose.

The rearward and forward portions of the body member, when in cooperative and sealing engagement therewith, provide a chamber 32 in communication with inlet means 22 and outlet means 30. Axially aligned within chamber 32 is, preferably, tube 34 provided with an aperture 36 to provide an annular chamber 38. The apertured tube 34, preferably, is made integral with axially inner inwardly directed flange means 40 integral with the plate 24 adjacent the outlet 30. Generally, no support means are necessary since the terminal portion of the tube 34 is in abutting relationship with the plate 16. If desired, annular seal 42 can be interposed between tube 34 and plate 16 at the inlet end and between tube 34 and flange 40 at the outlet end to assure a tight seal between the annular chamber and interior passageway 44.

A cylindrical wall 46, the longitudinal axis of which is substantially normal to the longitudinal axis of the body member 10 is provided for communication between the annular chamber 38 and the passageway 44 through an aperture 48 provided in the cylindrical wall 46.

In one embodiment of the instant invention, as best shown in FIGURE 2, axially aligned in cylindrical wall 46 is liquid material release means 50 comprising an axially disposed plunger member comprising an axially disposed rod 52 provided at one end thereof with sealing means 54 extending within passageway 44, said sealing means comprising an inverted cup, the periphery of which is adapted to be sealingly engageable with the interior surface 56 of the passageway 44. The other end of rod 52 extends without the body member 10 through aperture 58 and is provided with plunger member 60. Rod 52 is biased in the closed position by spring means 62 disposed about the rod 52 and fixedly attached at one end to rod 52, the other end being in abutting relationship to the interior surface 64 of the body member 10, thus forming an end wall 66 for the cylindrical wall 46. The end wall 66, if desired, can be reinforced.

In another embodiment of the instant invention, as best seen in FIGURE 4, the cylindrical wall 46 can be provided with concentrically disposed tube member 68 provided with an aperture 70 registrable with the aperture 48 on rotation of tube 68. One end of the tube member 68 is retainingly held in position by means of flange member 72 provided on cylindrical wall 46 adjacent the aperture 36. The other end of tube 68 is rotatably attached to pin 74, extending through body member 10, the outward end of which carries rotatable indicator 76. The exterior surface 78 of the body member 10 can be calibrated to indicate when aperture 70 is in alignment with aperture 48 of the cylindrical wall 46. This position can be designated as "on" on the body member 10. The non-alignment or non-registrable position can be designated "off."

As shown, the radially inner outwardly extending inlet and outlet means 22 and 30 are internally and externally threaded, respectively, to provide hose coupling means. Removably attached to the coupling means are closure members 80 whose transverse outer surfaces 82 and 84 lie in a plane subjacent or coincidental with a plane formed by the transverse peripheral surface of radially outer outwardly extending circumferential flanges 20 and 28. The container of this invention is particularly advantageous in that, because the transverse outer surfaces 82 and 84 of closure members 80 are either coplanar with or subjacent to the transverse surfaces of the radially outer outwardly extending circumferential flanges 20 and 28, more containers can be transported in a given space than devices of the same general description known heretofore.

The container is prepared for use by coupling the device into the hose line by screwing the inlet coupling 22 into the hose coupling 86 and screwing the outlet coupling 30 into the coupling 88 of a conventional spray nozzle. When the flow of water is properly established through the hose and passageway 44, indicator 76 or plunger 60 can be actuated to release liquid material from annular chamber 38 through cylindrical wall 46 in communication with passageway 44 so that the desired solution will be discharged from the nozzle.

The water-soluble or dispersible agent can be supplied to the container in conjunction with conventional gases employed in pressurized containers. Such gases include Freon or carbon dioxide. Further, conventional wetting agents can be included in the pressurized liquid when said liquid is a vegetation treating agent and the pressure within the container may vary from low to high in accordance with conventional practice. Regardless of the degree of miscibility of the pressurized fluid treating agent with the carrier fluid such as Freon, the mixing of these two components within the chamber 38 is sufficient to promote the desirable distribution of the liquid agent throughout the mixture discharged from the hose. Further, the concentration of the mixture when applied to the lawn or vegetation can be also controlled by adjusting the supply or rate of water flow through the hose when actuating the means to release the pressurized liquid agent from the device of this invention.

While the invention has been described in its preferred embodiments, there will be various modifications apparent to those skilled in the art, which modifications are considered to be within the scope of the appended claims.

What is claimed is:

1. A container adapted for connection with ordinary garden hose comprising a cylindrical body member defining a chamber and having a radially inner outwardly extending inlet and outlet, said inlet and outlet being threaded to provide hose coupling means; said body member provided at either end with a radially outer outwardly extending circumferential flange extending a distance at least substantially coplanar with said inlet and outlet; a cylindrical member axially aligned within said chamber and in communication with said coupling means, said cylindrical member together with said body member defining an annular chamber; said cylindrical member provided with means for communicating said annular chamber with said cylindrical member comprising a cylindrical tube having its longitudinal axis disposed transverse to the longitudinal axis of said body member and provided with an aperture for communicating said annular chamber with said cylindrical member and dispensing means axially aligned in said cylindrical tube.

2. The container of claim 1 wherein said dispensing means comprises a spring biased plunger member including a rod extending at a first end through the aperture in said cylindrical member and at a second end through said cylindrical body, sealing means fixedly attached to said first end and plunger member depressing means sealingly and fixedly attached to said second end, and spring means operatively connected to said rod within said cylindrical tube to bias said plunger member in a closed position.

3. The container of claim 1 wherein said dispensing means comprises a movable cylindrical element coaxially disposed within said cylindrical tube and provided with an aperture registrable with the aperture of said cylindrical tube, said cylindrical element at a first end in sealing abutting relationship with flange means provided at said cylindrical tube and at a second end sealingly extending through said cylindrical body member and indicator means fixedly attached to said second end for indicating registration of aperture of said cylindrical element with aperture of said cylindrical tube.

References Cited by the Examiner

UNITED STATES PATENTS

| | | | |
|---|---|---|---|
| 245,188 | 8/1881 | Marchand | 222—48 |
| 1,685,147 | 9/1928 | Case | 222—48 X |
| 1,961,173 | 6/1934 | Schutte et al. | 222—516 |
| 2,540,064 | 1/1951 | Weber | 239—310 X |
| 2,639,945 | 5/1953 | Rowlett | 239—310 X |
| 2,641,507 | 6/1953 | McGregor | 239—318 X |
| 2,975,804 | 3/1961 | Dunn et al. | 239—318 X |
| 3,132,806 | 5/1964 | McNair et al. | 239—318 |
| 3,182,860 | 5/1965 | Gallo | 222—145 X |
| 3,186,234 | 6/1965 | Solnick et al. | 222—133 X |
| 3,199,788 | 8/1965 | Davis | 222—145 X |

RAPHAEL M. LUPO, *Primary Examiner.*